(12) United States Patent
Ikeda et al.

(10) Patent No.: US 9,862,172 B2
(45) Date of Patent: Jan. 9, 2018

(54) METHOD FOR MANUFACTURING A LAMINATED FILM

(71) Applicant: 3M INNOVATIVE PROPERTIES COMPANY, St. Paul, MN (US)

(72) Inventors: Shinji Ikeda, Tokyo (JP); Hidetoshi Abe, Yamagata Pref. (JP); Yoshinori Araki, Yamagata Pref. (JP); Koji Saito, Yamagata Pref. (JP); Shinya Ohtomo, Yamagata Pref. (JP); Michael R. Kesti, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 311 days.

(21) Appl. No.: 14/404,042

(22) PCT Filed: May 30, 2013

(86) PCT No.: PCT/US2013/043222
§ 371 (c)(1),
(2) Date: Nov. 26, 2014

(87) PCT Pub. No.: WO2013/181315
PCT Pub. Date: Dec. 5, 2013

(65) Prior Publication Data
US 2016/0129680 A1    May 12, 2016

Related U.S. Application Data

(60) Provisional application No. 61/653,015, filed on May 30, 2012.

(51) Int. Cl.
*B32B 37/12* (2006.01)
*B41M 3/00* (2006.01)
*B41M 7/00* (2006.01)

(52) U.S. Cl.
CPC .............. *B32B 37/12* (2013.01); *B41M 3/008* (2013.01); *B41M 7/0081* (2013.01);
(Continued)

(58) Field of Classification Search
CPC ....... B32B 37/12; B41M 3/008; B41M 7/0081
See application file for complete search history.

(56) References Cited

U.S. PATENT DOCUMENTS

| 8,410,218 | B2 | 4/2013 | Abe | |
|---|---|---|---|---|
| 2007/0273739 | A1* | 11/2007 | Rodin | B41J 11/002 347/102 |
| 2011/0159255 | A1* | 6/2011 | Lin | C08J 7/123 428/202 |

FOREIGN PATENT DOCUMENTS

| CN | 101256313 | 9/2008 |
|---|---|---|
| CN | 102114737 | 7/2011 |

(Continued)

OTHER PUBLICATIONS

International Search Report for PCT International Application No. PCT/US2013/043222, dated Sep. 13, 2013, 3 pages.

*Primary Examiner* — Daniel McNally
(74) *Attorney, Agent, or Firm* — Emily M. Van Vliet; Steven A. Bern

(57) ABSTRACT

The present disclosure relates to a method for manufacturing the laminated film that is BSPC (Back Side Printable Clear) and has excellent interlayer adhesion. The method involves a first UV curing step and a second UV curing step and the laminated film includes a transparent film layer, a UV curable ink layer, and an adhesive layer. The first UV curing step includes disposing the UV curable ink layer on the transparent film layer and partially curing the UV curable ink layer by performing a first UV irradiation. The second UV curing step includes disposing the adhesive layer on a surface of the UV curable ink layer opposite the transparent (Continued)

film layer, and further curing the UV curable ink layer by performing a second UV irradiation.

8 Claims, 1 Drawing Sheet

(52) U.S. Cl.
CPC ....... *B32B 2305/72* (2013.01); *B32B 2305/74* (2013.01); *B32B 2307/412* (2013.01); *B41M 2205/10* (2013.01)

(56) References Cited

FOREIGN PATENT DOCUMENTS

| | | |
|---|---|---|
| EP | 1044821 | 10/2000 |
| JP | 57-122969 | 7/1982 |
| JP | H03-091582 A | 4/1991 |
| JP | 2000-180242 | 6/2000 |
| JP | 2003-56168 | 2/2003 |
| JP | 2006-248573 A | 9/2006 |
| JP | 2009-035602 | 2/2009 |
| JP | 2009-282471 | 12/2009 |
| JP | 2009282471 A * | 12/2009 |

* cited by examiner

METHOD FOR MANUFACTURING A LAMINATED FILM

CROSS REFERENCE TO RELATED APPLICATIONS

This application is a national stage tiling under 35 U.S.C. 371 of PCT/US2013/043222, filed May 30, 2013, which claims priority to Provisional Application No. 61/653,015, filed May 30, 2012, the disclosure of which is incorporated by reference in its/their entirety herein.

TECHNICAL FIELD

The present disclosure relates to a method for manufacturing a laminated film and more specifically relates to a method for manufacturing a laminated graphics film including a UV curable ink layer.

SUMMARY

According to the method for manufacturing the laminated film of the present disclosure, it is possible to make a laminated film with excellent interlayer adhesion.

The method for manufacturing the laminated film of the present disclosure is related to a laminated film including a transparent film layer, a UV curable ink layer, and an adhesive layer. The laminated film may further include a carrier film and/or a release liner. Preferably, the laminated film is approximately 50 to approximately 150 μm thick.

In one embodiment, the method for manufacturing the laminated film includes a first UV curing step and second UV curing step. The first UV curing step includes disposing the UV curable ink layer on the transparent film layer and partially curing the UV curable ink layer by performing a first UV irradiation with an irradiance less than 0.5 J/cm$^2$. Preferably, the disposing of the UV curable ink layer on the transparent film layer includes printing the UV curable ink on the transparent film layer by inkjet printing.

The second UV curing step includes disposing the adhesive layer on a surface of the UV curable ink layer opposite the transparent film layer and further curing the UV ink layer by performing a second UV irradiation with an irradiance of 0.5 J/cm2 to 1.5 J/cm$^2$. Advantageously, the second UV irradiation is performed within 1 hour after performing the first UV irradiation.

Preferably, the adhesive layer is transparent with respect to light having a wavelength of 200~800 nm and the second UV irradiation is carried out through the adhesive layer.

Preferably, the adhesive layer is a removable pressure sensitive adhesive layer.

In another embodiment, the laminated film is shown by the cross sectional view in FIG. 1, and includes the layers in the order of transparent layer 102, UV curable layer 104, and adhesive layer 106. In the embodiment of FIG. 1, the laminated film also includes carrier film 108 disposed above transparent film layer 102, and release liner 110 disposed below adhesive layer 106.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
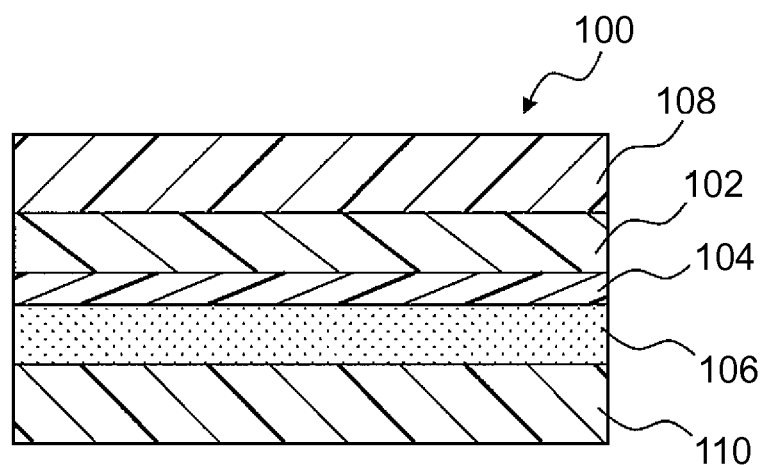
FIG. 1 is a cross sectional view of the laminated film with BSPC structure.

The detailed description below illustrates representative embodiments of the present invention with examples. However, the present invention is not limited to these embodiments.

Various products with a graphics laminated film fixed on a lighting unit of an internally illuminated signboard are commercially available and are used for advertising, signs, and trade name displays. These products, which are commonly called internally illuminated signboards, are used by turning on the light of the lighting unit so as to provide an internally illuminated signboard. The graphics laminated film may be removed by being detached from the lighting unit of the internally illuminated signboard after use. At the time of detaching the graphics laminated film, it is preferable that remnants of the film do not remain on the lighting unit of the internally illuminated signboard.

The present disclosure relates to a graphics laminated film with BSPC (Back Side Printable Clear) structure which includes a receptor layer to accept the printing ink such as UV curable forming a printed layer. Preferably, the receptor layer is a transparent film. In aspects where the receptor layer is a transparent film, the receptor layer may also be referred to as a transparent film layer. Disposed on the receptor layer is an adhesive layer. The receptor layer may have a laminated film top layer disposed on the printed layer in order to protect the printed layer. It has a simple structure as compared to a conventional graphics laminated film and a low production cost. In addition, the graphics laminated film with BSPC structure requires fewer organic substances and a lower combustion heat due to a simple laminated structure. Therefore, the environmental impact for disposal after usage is low without damaging the incombustibility of the structure on which the laminated structure is applied. The graphics laminated film with BSPC structure provides an improved product for signboard applications.

According to the present disclosure, "(meth) acrylic" is an "acrylic or methacrylic."

According to the present disclosure, the amount of UV radiation is the product of the irradiation time (seconds) and the irradiation strength (W/cm$^2$) on the irradiation surface irradiated from the light source. For example, wavelengths of 320 nm-390 nm are measured in a UV-A condition using the UV Power Puck II (EIT Co., Ltd.).

According to the present disclosure, the layer and material comprising the laminated film is "transparent," meaning the layers and material should have transmittance more than 70%, preferably more than 80% and more preferably more than 90% with respect to light having a wavelength of 200~800 nm. The transmittance is measured according to JISK 7105 plastic optical property test method 5.5 "Measurement method A of light transmittance and reflectance of the entire light." For example, it is measured by using spectrophotometric colorimeter CM-3700d (Konica Minolta Co., Ltd.).

Japanese published unexamined application No. 2009-282471, which is incorporated by reference in its entirety, describes "[t]he graphics structure containing a receptor layer, a printing layer created by printing on the receptor layer and an acrylic white adhesive layer wherein the acrylic white adhesive layer contains the carboxyl group containing (meth) acrylic polymer, white pigments of 8 to 150 mass portion with respect to the 100 mass portion of carboxyl group containing a (meth) acrylic polymer." The object of the present disclosure provides a method for manufacturing a graphics laminated film with BSPC structure with excellent interlayer adhesion.

The method for manufacturing a laminated film includes a first UV curing step and a second UV curing step. The laminated film includes, in order, a transparent film layer, a printed layer including UV curable ink, and an adhesive layer. The first UV curing step includes disposing the UV curable ink layer on the transparent film layer and partially curing the UV ink layer by performing a UV irradiation according to the present disclosure. The second UV curing step includes disposing the adhesive layer on the surface of the UV curable layer opposite to the transparent film layer and further curing the UV ink layer by performing the UV irradiation according to the present disclosure.

The transparent film layer of the graphics laminated film includes a resin composition commonly used as a receptor for various types of printings. The resin composition may be, for example, a thermoplastic resin selected according to the ink used and the method for printing the ink. The resin composition of the transparent film layer may contain acrylic resin, acrylic urethane, polyurethane, polyester, polyvinyl acetate, polyvinyl chloride, and polystyrene etc. The transparent film layer can be formed by applying the resin composition on a carrier film having a desired thickness and drying or curing it as per necessity.

The thickness of the transparent film layer has no specific limit but may be more than approximately 1 µm or 5 µm and less than approximately 100 µm or 50 µm. The thickness of the transparent film layer can be selected according to the application of the laminated film and the method for printing the ink. The transparent film layer may optionally have a primer layer to increase the adhesion of the UV curable ink layer to the surface on which the UV curable ink layer is printed. To improve the printing performance of the UV curable ink layer, surface treatments such as plasma treatment, corona treatment, flame treatment, electron irradiation treatment, rough surface treatment, or ozone treatment may be performed on the surface of the transparent film layer.

The laminated film may optionally include a carrier film on the surface of the transparent film layer opposite the UV curable ink layer. The carrier film protects the transparent film layer surface during the manufacturing of the laminated film. In such embodiments, the laminated film is manufactured using a laminate of the transparent film layer and the carrier film. The carrier film is removed at the time of using the laminated film. The carrier film may be comprised of any suitable material, for example, polyesters such as polyethylene terephthalate (PET), polyolefins such as polyethylene (PE) or polypropylene (PP), polyvinyl chloride, acrylic polymers, urethane polymers, or fluorinated polymers. The carrier film can be formed by applying a composition containing any of the above polymers on the transparent film layer and drying or curing it.

The thickness of the carrier film can be selected according to the manufacturing conditions and usage conditions of the laminated film. For example, the thickness may be more than approximately 5 km or 10 µm or less than approximately 500 µm or 300 µm. The carrier film may be transparent or opaque. If the carrier film is transparent, UV irradiation can be carried out on a UV curable ink layer through the carrier film and the transparent film layer. The carrier film may have a blocking inhibition treatment layer, for example, back surface treatment layer containing the micro globules and non-adhesive resin on the surface opposite to the transparent film layer.

The printed layer of the graphics laminated film is formed by printing an ink on a receptor layer using various methods such as inkjet printing, screen-printing, or electrostatic printing. Preferably the ink is a UV curable ink. In aspects where the ink is a UV curable ink, the printed layer may also be referred to as a UV curable ink layer. UV ink has curability and can be cured by UV irradiation. The basic material receives less calorific value at the time of curing. Due to this, it is specifically used to print to plastic film which is easily affected by heat. In addition, UV curable ink is generally solventless and since solvent is not discharged into the environment at the time of curing, it is suitable for printing films with low solvent resistance. In addition, it can also reduce the environmental impact. However, solventless UV curable ink is thick compared to a conventional solvent ink with a low leveling ability. Therefore, the printed layer tends to be thick. When performing fine printing using inkjet printing, insufficient leveling causes the printed layer to become uneven. Therefore, an adhesive layer gets accumulated on the printing layer and good adhesion cannot be achieved between the printing layer and adhesive layer in the graphics laminated film with BSPC structure. As described previously, this may give rise to the problem of film remnants remaining on the lighting unit of an internally illuminated signboard at the time of removing the graphics laminated film from the lighting unit of the internally illuminated signboard.

The UV curable ink layer is formed by printing the UV ink on the transparent film layer using inkjet printing, screen printing, electrostatic printing, etc., and curing by UV irradiation. The UV curable ink layer may be continuous or discontinuous. The UV ink layer may form characters, patterns, images and marks. The UV curable ink layer may be a single color or multicolor.

The thickness of the UV curable ink layer has no specific limit but it may be for example, more than approximately 1 µm or 2 µm and less than approximately 10 µm or 5 µm. The thickness of the UV curable ink layer changes according to the rheological properties (for example the viscosity) of the ink and the method and conditions for printing. The thickness of the ink layer may be adjusted depending on the application of the laminated film.

The UV curable ink includes a polymerizable monomer and/or oligomer, a photoinitiator, and a colorant. If desired it may also contain a dispersing agent and/or a surfactant. It can be classified into two types according to the polymerizable monomer or oligomer and the photoinitiator to be used: a radical polymerization type, and a cation polymerization type. The radical polymerization type UV curable ink commonly includes an acrylate monomer or oligomer, and a photoinitiator such as benzophenone or phenylphosphine oxide. The cation polymerization type UV curable ink commonly includes an epoxy monomer and a photoinitiator such as an onium salt (for example, a diallyliodonium salt or a triallylsulfonium salt). The UV curable ink is generally solventless to provide low environmental impact and cost. To further increase the interlayer adhesion between the UV curable ink layer and the adhesive layer, a radical polymerization UV curable ink is preferred when the adhesive or a pressure sensitive polymer included in the adhesive layer comprises an acrylic, and a cation polymerization type UV curable ink is preferred when the adhesive or a pressure sensitive polymer included in the adhesive layer comprises a urethane or ester.

The adhesive layer includes an adhesive or pressure sensitive polymer such as acrylic, urethane, polyester, or silicon. The adhesive or the pressure sensitive agent may further include a white pigment such as zinc carbonate, zinc oxide, zinc sulfide, or titanium oxide (titanium dioxide) to provide a covering to the laminated film and to reduce the difference in color density in UV curable ink layers. However, as described below, if the adhesive or pressure sensitive agent is transparent, the interlayer adhesion between the adhesive layer and the UV curable ink layer may be increased by performing a UV irradiation through the adhesive layer. For some applications of the graphics laminated film the adhesive layer may preferably be a removable pressure sensitive which means the graphics laminated film can be easily removed from the adherend after usage.

In some embodiments, including an acrylic adhesive or pressure sensitive agent in the adhesive layer is advantageous. The acrylic adhesive or pressure sensitive agent may include an unreacted acrylic group. When a radical polymerization type UV curable ink is used, an unreacted acrylic group can form a chemical bond between the UV curable ink layer and the adhesive layer by reacting with a reactive group present in the UV curable ink and increasing the interlayer adhesion between the UV curable ink layer and the adhesive layer. When a cation polymerization type UV curable ink is used, including an adhesive or pressure sensitive agent of urethane or polyester in the adhesive layer may be used. Hydroxyl groups or carboxyl groups in the adhesive or pressure sensitive agent may react with an epoxy group present in the UV curable ink increasing the interlayer adhesion between the UV curable ink layer and adhesive layer in the same manner.

As described in Japanese published unexamined application No. 2009-035602, which is incorporated by reference in its entirety, in certain embodiments, an adhesive layer can be formed using an acrylic pressure sensitive agent by including carboxyl group containing (meth) acrylic adhesive polymer with a weight-average molecular weight less than 800,000 and a glass transition temperature $-100°$ C. to $-30°$ C., and an amino group containing (meth) acrylic non-adhesive polymer with an average molecular weight 30,000 to 100,000 and a glass transition temperature $20°$ C. to $90°$ C., amino group containing (meth) acrylic adhesive polymer in the amount of more than 1 mass portion and less than 20 mass portion with respect to 100 mass portion of carboxyl group containing (meth) acrylic adhesive polymer and further including cross linking agents such as bisamido cross linking agent, aziridine cross linking agent, carbodiimide cross linking agent, epoxy cross linking agent and isocyanate cross linking agent to react with the carboxyl group and/or amino group as per necessity.

There is no specific limit for the thickness of the adhesive layer. For example, the thickness may be more than approximately 5 µm or 10 µm and less than approximately 100 µm or 50 µm. When UV irradiation is to be performed through the transparent adhesive layer, advantageously the adhesive layer is as thin as possible to obtain the necessary adhesive strength according to the application and it is advantageous from the aspect of further increasing the interlayer adhesion between the UV curable ink layer and the adhesive layer by successfully curing the UV curable ink. In such embodiments, the thickness of the adhesive layer may be less than approximately 50 µm or 30 µm. The average roughness (Ra) of the surface of the adhesive layer may be approximately more than 0.1 µm with regular or irregular bumpy shape so that repositioning is possible during application of the laminated film to a substrate. A bumpy surface can be formed on the adhesive layer by holding a tool having a bumpy shape on the surface of the adhesive layer and copying the bumpy shape of the tool on the surface of the adhesive layer. A bumpy surface can also be formed on the adhesive layer by providing an irregularity to the surface of the release liner and laminating the release liner on the adhesive layer.

For example, when the images and patterns formed on the UV curable ink layer, which is partially cured by the UV irradiation, are accurate, an adhesive sheet containing the adhesive or pressure sensitive adhesive is laminated on the UV curable ink layer and the adhesive layer can be disposed on the UV curable ink layer without damaging these images and patterns. At the time of laminating the adhesive sheet on the UV curable ink layer, the adhesive sheet may conform sufficiently to the shape of the surface of the UV curable ink layer by applying pressure and warmth. The thickness of the adhesive sheet is practically equivalent to the thickness of the adhesive layer. For example it may be more than approximately 5 µm or 10 µm and less than approximately 100 µm or 50 µm.

The laminated film may optionally further include a release liner to protect the adhesive layer. The release liner is removed at the time of adhering the laminated film to a substrate. The release liner may be any type of liner commonly used for releasing adhesives. For example, a film containing polymers such as polyethylene, polypropylene, polyester, or acetylcellulose, laminated paper coated by these polymers, or uncoated paper may be used. Release of the adhesive from the release liner may be improved by, for example, silicone treatment of the surface contacting the adhesive layer. As described above, regarding the surface of the adhesive layer, a bumpy shape may similarly be given to the surface of the release liner. If the adhesive layer and the release liner are transparent, UV irradiation can be carried out on the UV curable ink layer through the release liner and the adhesive layer.

The laminated film may optionally further include other additional layers such as, for example, a support layer and/or a reflection layer. The thickness of the laminated film containing a carrier film and a release liner may be more than approximately 10 µm or 20 µm and less than approximately 1 mm or 500 µm. In one embodiment of the present disclosure, the laminated film comprises an adhesive layer, a UV curable ink layer and a transparent layer with a thickness more than approximately 50 µm and less than approximately 150 µm. A thin laminated film with such simple laminated structure uses fewer organic substances with less combustion heat. Therefore, the environmental impact for disposal after usage is low without damaging the incombustibility of the structure on which the laminated film is applied.

The method for manufacturing the laminated film of the present disclosure includes a first and a second UV curing step. The first UV curing step includes disposing a UV curable ink layer on a transparent film layer and partially curing the UV curable ink layer by performing a first UV irradiation with an irradiance less than 0.5 J/cm². The second UV curing step includes disposing an adhesive layer on the surface of the UV curable ink layer opposite the transparent film layer and further curing the UV curable ink layer by performing a second UV irradiation with an irradiance of 0.5 J/cm² to 1.5 J/cm² and performing the second UV irradiation within 1 hour after the first UV irradiation in the first UV curing step.

Figure 2:
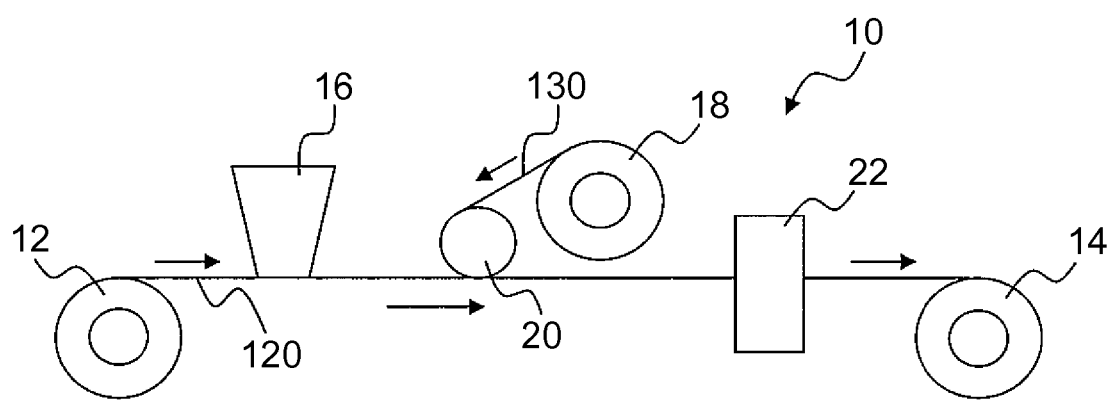
FIG. 2 is a schematic view showing the laminated film manufacturing device used in the method for manufacturing the laminated film according to the embodiment of the present disclosure.

FIG. 2 shows a schematic view of the laminated film manufacturing device 10 used in the method for manufacturing the laminated film by an embodiment of the present disclosure. An example of a method for manufacturing a laminated film of the present disclosure is described by referring to FIG. 2. FIG. 2 describes a method for manufacturing a continuous laminated film by using a roll to roll method. However, the method for manufacturing the laminated film of the present disclosure can be executed by using a batch method following a sheet fed treatment.

The laminated body 120 of transparent film layer 102 and carrier film 108 is supplied in roll 12. In the first UV curing step, UV curable ink layer 104 is disposed on transparent film layer 102 by printing the UV curable ink using inkjet printing, screen printing, or electrostatic printing, and UV curable ink layer 104 is partially cured by performing a first UV irradiation with a UV irradiance of less than 0.5 J/cm². The lower limit value of the irradiance of the UV irradiation may vary according to the thickness of UV curable ink layer but commonly it is approximately 0.1 J/cm². UV irradiance may vary according to the line speed and output of UV light source. For example it may be less than approximately 0.1 J/cm² to 0.5 J/cm² and approximately 0.15 J/cm² to 0.48 J/cm² or approximately 0.2 J/cm² to 0.45 J/cm². In FIG. 2, inkjet printing of UV curable ink and partial curing of UV curable ink layer 104 is performed by using the inkjet printing device 16 with the UV irradiation device provided internally. Though not restricted by any theory, the area physically contacted with the adhesive layer may be reduced further as the UV curable ink layer does not cure beyond the mark due to partial curing of the UV curable ink layer and/or chemical bonds can be formed by allowing a polymerizable group, such as acrylate group or epoxy group remaining in the UV curable ink layer to react with a reactive base included in the adhesive layer by performing the UV irradiation described in the second UV curing step. As a result, the interlayer adhesion between the adhesive layer and the UV curable ink layer can be increased.

The method for manufacturing the laminated film of the present disclosure is well suited for an embodiment which includes printing of UV curable ink on the transparent film layer by using the inkjet printing. The method for manufacturing the laminated film of the present disclosure is well suited for the roll-to-roll printing method.

Then, according to the second UV curing step, adhesive layer 106 is disposed on UV curable ink layer 104 on the surface of UV curable ink layer 104 opposite transparent film layer 102 and is further cured by a second UV irradiation. Again, UV irradiance may vary according to the line speed and output of the UV light source. For example it may be approximately 0.5 J/cm² to 1.5 J/cm², and approximately 0.5 J/cm² to 1.3 J/cm² or approximately 0.5 J/cm² to 1.2 J/cm². The adhesive layer can be formed by applying an adhesive or a pressure sensitive agent on the UV curable ink layer by using a knife coater, a bar coater, or other coating methods known in the art. The coating amount of the adhesive or pressure sensitive agent is approximately 0.1 g/m² to 30 g/m² or approximately 2 g/m² to 10 g/m². With the above range, sufficient adhesive strength can be assured and drying or curing defects can be avoided.

In another embodiment, adhesive layer 106 is disposed on UV curable ink layer 104 by placing and laminating an adhesive sheet on UV curable ink layer 104. In this embodiment, though the images and patterns formed on the UV curable ink layer are accurate, the adhesive layer can be easily provided on the UV curable ink layer without damaging these images and patterns. In FIG. 2, adhesive sheet 130 with release liner 110 (not illustrated in the figure) is rolled up and supplied from roll 18 and adhesive sheet 130 is fixed and laminated on UV curable ink layer 104 so that it comes in contact with UV curable ink layer 104 by using the roll form laminator 20 provided with a heating mechanism as necessary. At the time of laminating the adhesive sheet 130 on UV curable ink layer 104, the adhesive sheet 130 may be conformed sufficiently to the shape of the surface of UV curable ink layer 104 by applying pressure and warmth.

After that, UV irradiation is performed on UV curable ink layer 104 by using UV irradiation device 22. The laminated sheet obtained in such a way is rolled up by using winding roll 14 and the roll shape product can be obtained.

As the UV light source of the UV irradiation device, low pressure mercury lamp, high pressure mercury lamp, very high pressure mercury lamp, halogen lamp, excimer lamp, laser light source (light source such as helium-cadmium laser or excimer laser), or UV-LED can be used. When the laminated film is manufactured by using a roll to roll method, the line speed (supply speed of transparent film layer) is approximately 0.01 m/minute to 4 m/minute and approximately 0.05 m/minute to 2 m/minute or approximately 0.08 m/minute to 1 m/minute.

It is advantageous to perform the second UV irradiation curing step immediately after the first UV irradiation for example within 1 hour, preferably within 10 minutes and more preferably within 1 minute as it is possible to increase the interlayer adhesion between the UV curable ink layer and the adhesive layer.

UV irradiation in the first UV curing step is commonly performed through the UV curable ink layer but it can be performed through the transparent film layer. When a carrier film is used, it is possible to perform the UV irradiation through the transparent carrier film and the transparent film layer when the carrier film is transparent. It is preferable to perform the UV irradiation from both surfaces of the UV curable ink layer by using the transparent carrier film as per necessity to partially cure the thick UV curable ink layer uniformly.

UV irradiation in the second UV curing step is advantageous to perform through the transparent adhesive layer by providing transparent adhesive layer on the UV curable ink layer as it further increases the interlayer adhesion between the adhesive layer and the UV curable ink layer. UV irradiation can also be performed through the transparent film layer or through the transparent carrier film and the transparent film layer. It is advantageous to perform UV irradiation from both surfaces of the UV ink layer through both of transparent film layer and transparent adhesive layer to cure thick UV curable ink layer completely and uniformly.

UV irradiation in the first and second UV curing step can be performed under inert atmosphere such as nitrogen and argon to reduce polymerization inhibition due to oxygen in the air when the UV curable ink is of radical polymerization type. In addition, when UV curable ink is of cation polymerization type, it is better to adjust the temperature inside the manufacturing device or operation environment to avoid curing defects due to moisture in the air.

To increase the printing performance of the UV curable ink layer, it is advantageous to perform surface treatments such as plasma treatment, corona treatment, frame treatment, electron irradiation treatment, or rough surface treatment on the surface of the transparent film layer in-situ before disposing the UV curable ink layer.

The laminated film obtained by the method for manufacturing the laminated film of the present disclosure can be used by adhering to indoor and outdoor vehicles, large buildings (walls, columns etc.), traffic signals, packaging material, or sign boards. In addition, the laminated film can be used as internally illuminated graphics or internally and externally illuminated graphics by fixing it on the internally illuminated sign board surface.

Example 1

The present disclosure is illustrated by example with the following basic embodiment of the present disclosure: however, the scope of this disclosure is not construed to be limited by the scope of this example. The raw material or the product used for manufacturing the laminated film is as follows:

Transparent film layer and carrier film: acrylic film (transparent film layer) used in Scotchcal (registered trade name) film IJ5384/polyester film (carrier film) laminated body (Sumitomo 3M Limited), UV curable ink: 3M (registered trade name) UV2800 ink (Sumitomo 3M. Limited), ink density 300% (yellow 66%, magenta 66%, cyan 66% and black 100%) Adhesive layer: Acrylic transparent pressure sensitive adhesive sheet (object wherein the adhesive composition described in embodiment 1 of the Japanese published unexamined patent application No. 2009035602 is formed like a sheet on the polyethylene covering release paper) Release liner: Transparent polyester film with a thickness of 50 μm and one side treated with a silicone-based release agent.

The laminated film was manufactured by the following procedure: UV 2800 ink was printed on a square with size 250 mm×250 mm by using VUTEkQS2000 (EFI Co., Ltd.) as the UV curable inkjet printer on the surface of the acrylic film of the laminated body of acrylic film/polyester film and at the same time UV irradiation was performed. Then, acrylic transparent pressure sensitive adhesive sheet was laminated on the partially cured UV 2800 ink by using a hand roller. Polyethylene covering release paper was removed from the laminated body obtained and a transparent polyester film (release liner) was pasted on the surface of the acrylic transparent pressure sensitive adhesive so that the silicon treated surface comes in contact with the transparent pressure sensitive adhesive. After that, excluding comparison examples 1 to 4, UV was irradiated in UV 2800 ink through the transparent polyester film and an acrylic transparent pressure sensitive adhesive below it. The cross sectional view of the laminated film obtained is as shown in FIG. 1.

The relation between setting of QS2000 irradiance and the UV irradiance (wavelength 320 nm to 390 nm, UVA) is shown in FIG. 1.

TABLE 1

| UVA irradiance | |
|---|---|
| Setting of QS2000 UV irradiance | UV Irradiance (J/cm²) |
| 100%: High | 0.770 |
| 75%: Medium | 0.542 |
| 50%: Low | 0.408 |
| 25%: Minimum | 0.235 |

Interlayer adhesion of the laminated film obtained was evaluated by T-peel test, the procedure of which is shown below. The carrier film was removed from the laminated film and the white color PVC film (S/C3650PR, Sumitomo 3M Limited) was pasted on the transparent film layer as a support medium which provides stiffness to the laminated film. The laminated film was cut into a strip with a length 150 mm×width 25 mm. Then, release liner was removed, stripe was folded in such a way that two short sides of the strip gets overlapped and come face to face with the adhesive layer, adhesive layers were fixed by using hand roller, aging was performed for 30 minutes in an oven at 650° C. and furthermore aging was performed for 10 minutes at a room temperature. Two overlapping short sides of the obtained material were hold tightly with right and left hand and an interlayer adhesion of transparent film layer/UV curable ink layer/adhesive layer was confirmed visually after quickly pulling the two short sides apart at an angle of 180 degrees. When released between the two tightly attached adhesive layers, the splitting of the laminated film was considered to be 0%. When the transparent film layer and the UV curable ink layer and/or the UV curable ink layer and the adhesive layer are separated, the area generated by these splitting was represented by percentage.

The evaluation result obtained by T-peel test after manufacturing the laminated film under such UV irradiation conditions is shown in Table 2.

TABLE 2

| | T-peel test result with UV irradiation conditions | | | | | | |
|---|---|---|---|---|---|---|---|
| | First UV irradiation | | Second UV irradiation | | Interval of first and second UV irradiation | Aging at room temperature before T-peel test | Splitting of Laminated film |
| | UV irradiance (J/cm²) | Irradiance Setting | UV irradiance (J/cm²) | Irradiance Setting | | | |
| Example 1 | 0.408 | 50% | 0.542 | 75% | 5 min | None | 0% |
| Example 2 | 0.235 | 25% | 0.542 | 75% | 5 min | None | 0% |
| Comparative Example 1 | 0.770 | 100% | None | — | — | None | 100% |
| Comparative Example 2 | 0.542 | 75% | None | — | — | None | 100% |

TABLE 2-continued

T-peel test result with UV irradiation conditions

| | First UV irradiation | | Second UV irradiation | | Interval of first and second UV irradiation | Aging at room temperature before T-peel test | Splitting of Laminated film |
|---|---|---|---|---|---|---|---|
| | UV irradiance (J/cm$^2$) | Irradiance Setting | UV irradiance (J/cm$^2$) | Irradiance Setting | | | |
| Comparative Example 3 | 0.408 | 50% | None | — | — | None | 100% |
| Comparative Example 4 | 0.235 | 25% | None | — | — | None | 100% |
| Comparative Example 5 | 0.770 | 100% | 0.542 | 75% | 5 min | None | 100% |
| Comparative Example 6 | 0.542 | 75% | 0.542 | 75% | 5 min | None | 100% |
| Comparative Example 7 | 0.408 | 50% | 0.542 | 75% | 1 day | 1 day | 100% |
| Comparative Example 8 | 0.235 | 25% | 0.542 | 75% | 1 day | 1 day | 100% |

REFERENCE NUMERALS

10 Laminated film manufacturing device
12 Winded roll
14 Winding roll
16 Inkjet printing device
18 Adhesive sheet winded roll
20 Laminator
22 UV irradiation device
100 Laminated film
102 Transparent film layer
104 UV curable ink layer
106 Adhesive layer
108 Carrier film
110 Release liner
120 Laminated body of transparent film layer/carrier film
130 Adhesive sheet

The invention claimed is:

1. A method for manufacturing a laminated transparent film comprising:
    disposing an UV curable ink layer to a first side of a transparent film having a first and second side, then partially curing the UV curable ink layer by exposing the UV curable ink layer to ultraviolet radiation with an irradiance less than 0.5 J/cm$^2$;
    disposing an adhesive layer onto the partially cured UV curable ink layer; within an hour after the partial curing step, curing the UV curable ink layer by exposing the UV curable ink layer to ultraviolet radiation with an irradiance of between 0.5 J/cm$^2$ to 1.5 J/cm$^2$.

2. The method of claim 1 wherein disposing the UV curable ink layer on the transparent film layer comprises printing the UV curable ink on the transparent film by inkjet printing.

3. The method of claim 1 wherein disposing the adhesive layer onto the partially cured UV curable ink layer comprises coating the adhesive layer on the partially cured UV curable ink layer.

4. The method of claim 1 wherein the adhesive layer is transparent with respect to light having a wavelength of 200~800 nm and the second curing step is carried out with radiation through the adhesive layer.

5. The method of claim 1 wherein the laminated transparent film is approximately 50 to approximately 150 μm thick.

6. The method of claim 1 wherein the adhesive layer is a removable pressure sensitive adhesive layer.

7. The method of claim 1, wherein disposing an adhesive layer onto the partially cured UV curable ink layer comprises laminating a film of adhesive onto the partially cured UV curable ink layer.

8. The method of claim 1, wherein a carrier film is disposed on the second side of the transparent film, opposite the UV curable ink layer.

* * * * *

UNITED STATES PATENT AND TRADEMARK OFFICE
CERTIFICATE OF CORRECTION

PATENT NO. : 9,862,172 B2
APPLICATION NO. : 14/404042
DATED : January 9, 2018
INVENTOR(S) : Shinji Ikeda It is certified that error appears in the above-identified patent and that said Letters Patent is hereby corrected as shown below:

In the Specification

Column 3
Line 63, delete "may be" and insert -- maybe --, therefor.

Column 4
Line 7, delete "km" and insert -- μm --, therefor.

Column 9
Line 30, delete "Limited)," and insert -- Limited). --, therefor.
Line 31, delete "3M." and insert -- 3M --, therefor.
Line 36, delete "2009035602" and insert -- 2009-035602 --, therefor.

Column 10
Line 36 (approx.), delete "650° C." and insert -- 65° C. --, therefor.

Signed and Sealed this
Tenth Day of July, 2018

Andrei Iancu
*Director of the United States Patent and Trademark Office*